June 19, 1945.  F. W. SLACK ET AL  2,378,589
POWER DRIVING UNIT
Filed May 4, 1942   6 Sheets-Sheet 1

INVENTORS
FREDERIC W. SLACK
MELBOURNE L. CARPENTIER
BY
ATTORNEYS.

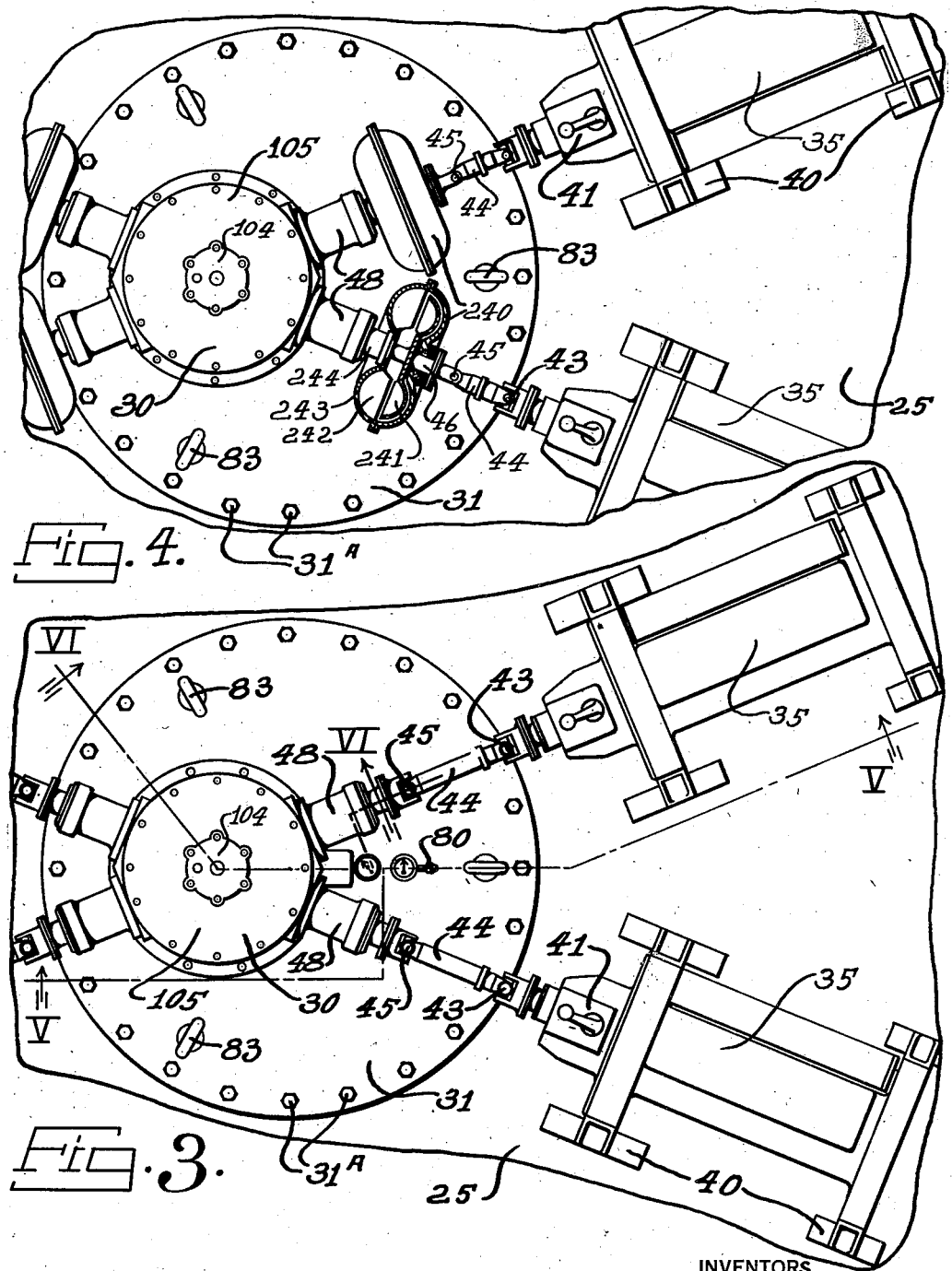

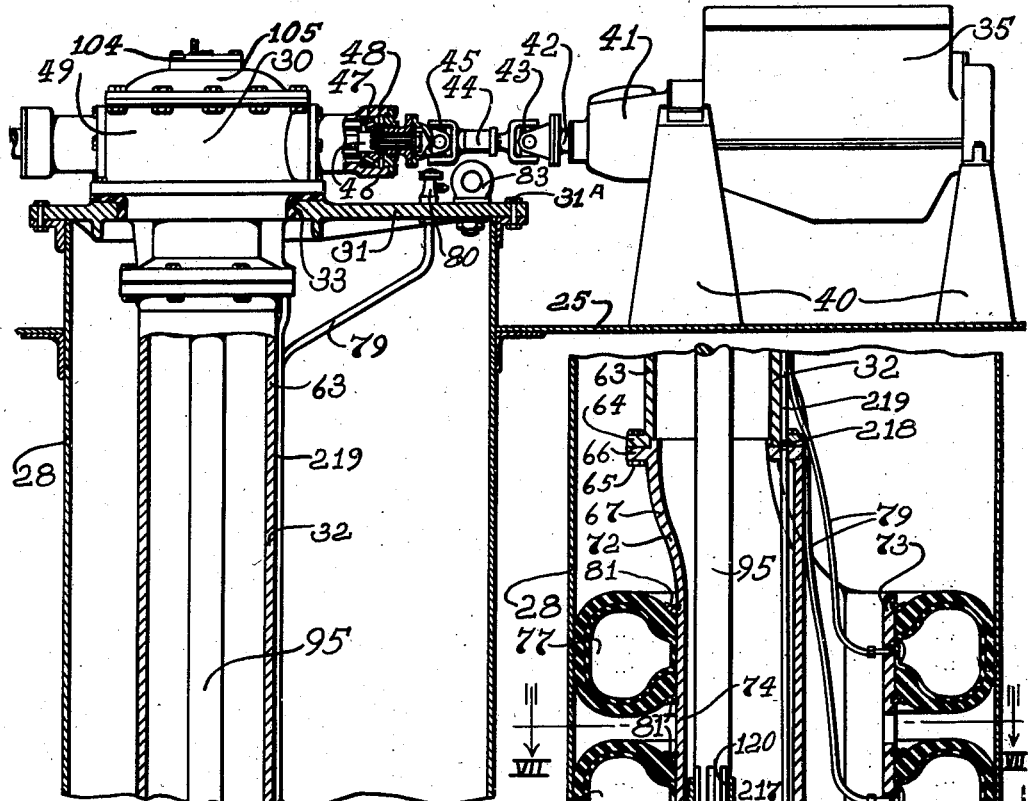
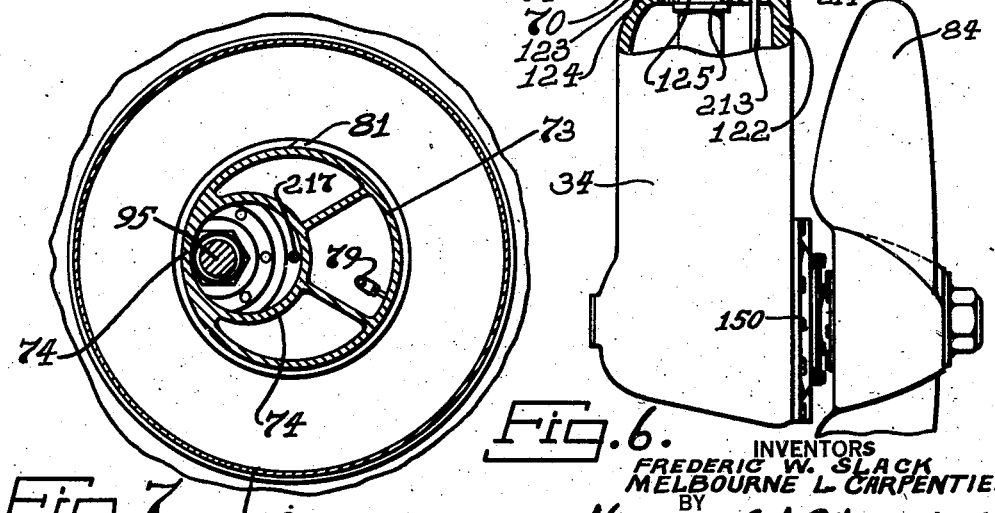

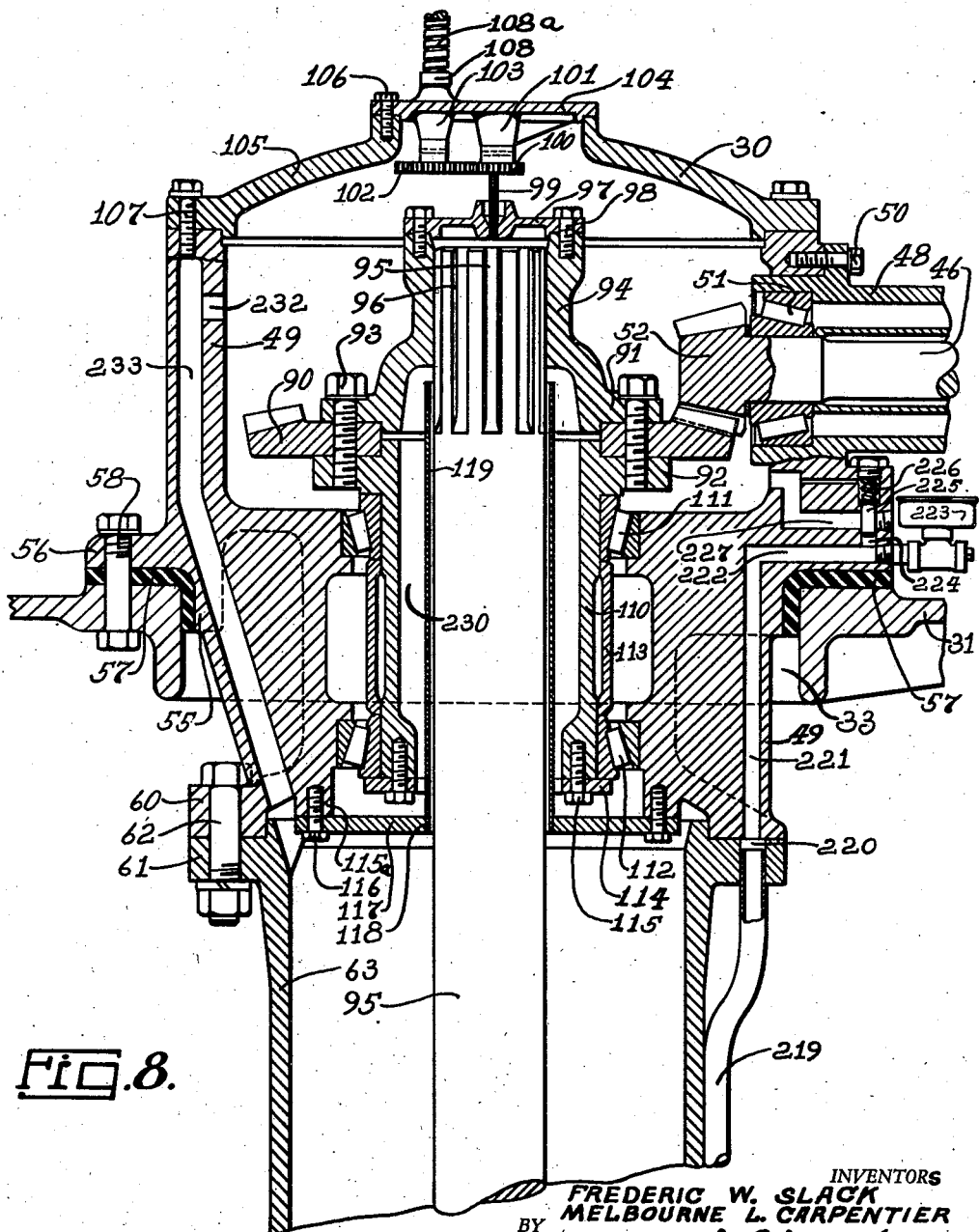

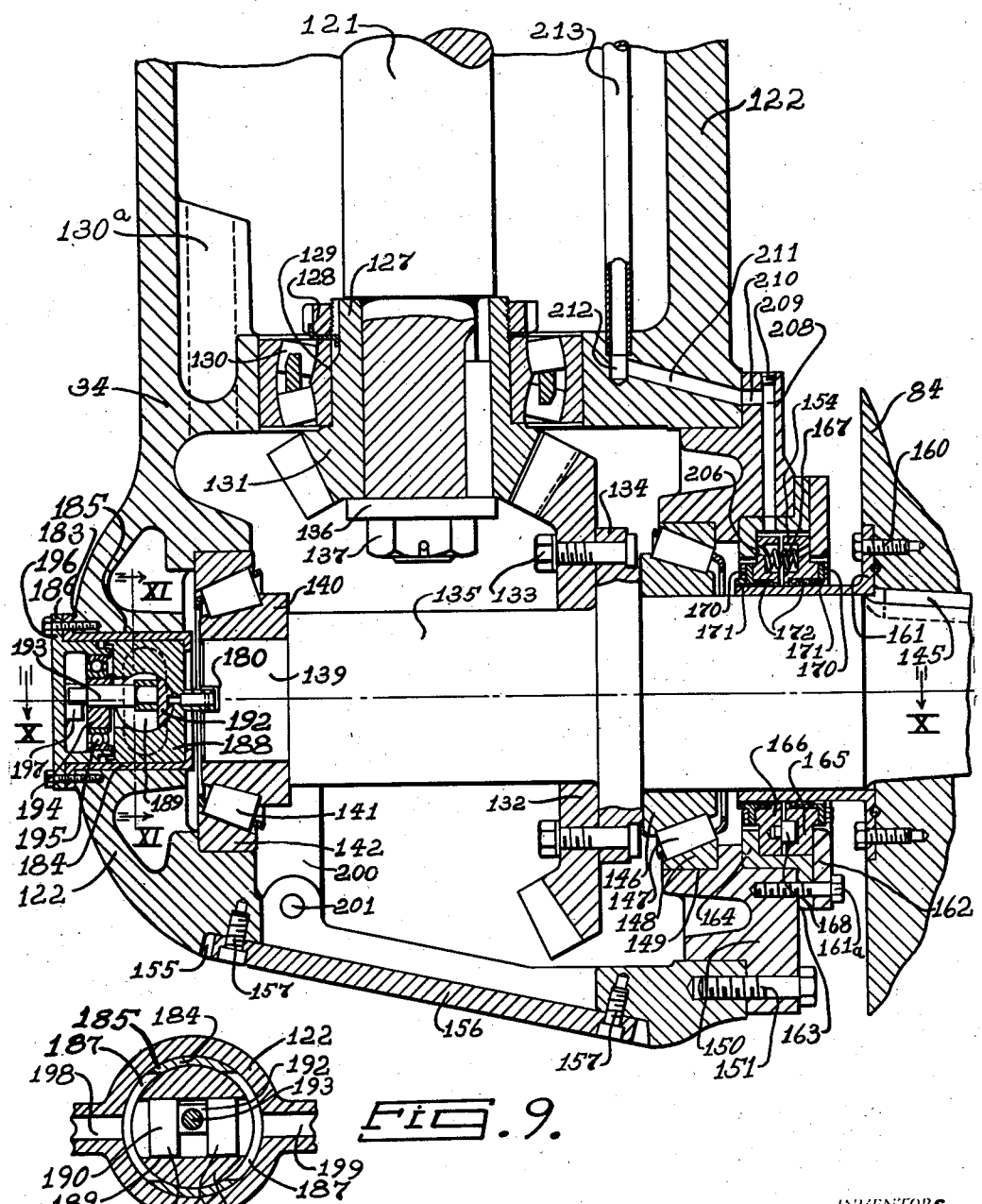

INVENTORS
FREDERIC W. SLACK
MELBOURNE L. CARPENTIER
BY
ATTORNEYS

Patented June 19, 1945

2,378,589

UNITED STATES PATENT OFFICE 2,378,589

POWER DRIVING UNIT

Frederic W. Slack and Melbourne L. Carpentier, Detroit, Mich., assignors to Chrysler Corporation, Highland Park, Mich., a corporation of Delaware Application May 4, 1942, Serial No. 441,688

13 Claims. (Cl. 115—34)

Our invention relates to power driving units and it has particular relation to an assembly which permits of employing a plurality of rotors or engines as component parts of a single power unit and which is readily movable as a unit. More specifically, our invention relates to a portable power transmitting mechanism suitable for use in propelling boats, in pumping liquids from ships, vats, or tanks, and generally any application requiring portability or readily replaceable power units of small or moderate individual capacity used in multiple to obtain high capacities.

An object of our invention is to provide a power transmitting assemblage which will permit using one or more high speed engines to drive a single propeller, and at a reduced speed, through a self contained and self supporting mechanism of rugged, simple and inexpensive construction.

A further object of our invention is to provide a novel type of lubricating system for such assemblage which will maintain an ample supply of oil at the moving parts at all times while maintaining a relatively small total quantity of oil in the assemblage.

Another object of our invention consists in providing a readily portable power unit of enormous capacity made up of readily replaceable standard small power units and having a sealed self-contained lubricating system.

For a better understanding of our invention reference may now be had to the accompanying drawings in which:

Fig. 3 is a plan view of a portion of one of the power transmitting units illustrated in Fig. 1.

Fig. 4 is a somewhat similar view illustrating a modification of our invention.

Fig. 5 is a cross-sectional view of the upper portion of one of our power transmitting units, the view representing a section taken substantially along the line V—V of Fig. 3.

Fig. 6 is a cross-sectional view of the lower portion of one of our power transmitting units, the section being taken substantially along the line VI—VI of Fig. 3.

Fig. 7 is a cross-sectional view of the structure illustrated in Fig. 6, the view being taken along the line VII—VII thereof.

Fig. 8 is an enlarged cross-sectional view of the upper end of one of our power transmitting units showing the speed reducing mechanism as well as the means for supporting the vertical shaft and the main housing.

Fig. 9 is a cross-sectional view of the lower or propeller end of one of our power transmitting units, the section being taken in a vertical plane.

Fig. 11 is a cross-sectional view of the oil pump employed in lubricating the various parts of our power transmitting assemblies, the view being taken along the line XI—XI of Fig. 9.

We do not claim to be the inventors of the broad idea of a propeller unit which may be inserted or removed through a substantially vertical opening in the hull of a vessel, our invention being limited rather to a multiplicity of improvements in those mechanisms which simplify, improve and render them less expensive.

Figure 1:
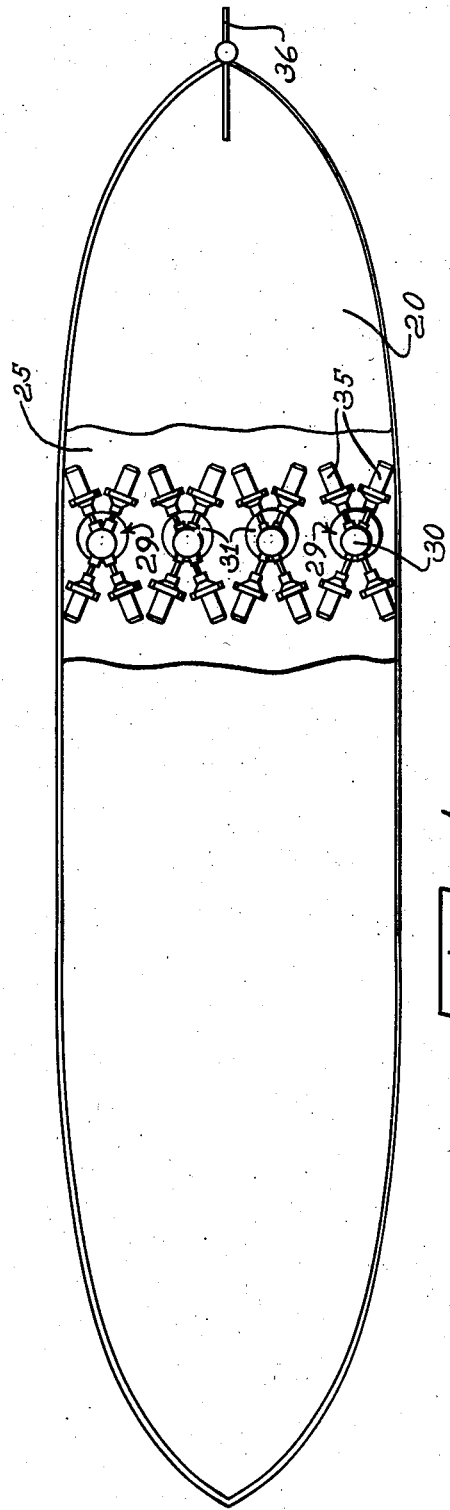
Fig. 1 is a plan view of a boat provided with a plurality of power transmitting units built in accordance with our invention, a portion of the superstructure of the boat having been removed for the sake of clarity.
Figure 2:
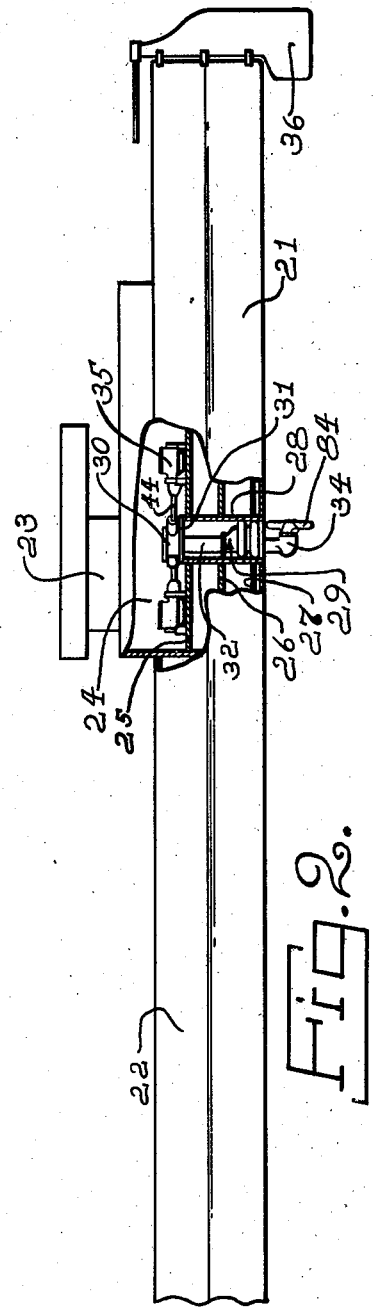
Fig. 2 is a side elevational view of the boat shown in Fig. 1 with a portion of the hull broken away, in order to permit showing the power transmitting assemblage in position, a portion of the boat being shown in cross-section.

As illustrated, we have shown a boat 20 provided with a hull 21, an upper deck 22, a superstructure 23 including a housing or cabin 24 which has an intermediate deck 25, a second deck 26 and a lower deck 27 which is disposed adjacent the hull 21. The decks 25, 26 and 27 ordinarily do not extend into the cargo carrying portion of the hull, but may if so desired. A substantially vertical cylinder 28 is connected to the several decks 25, 26 and 27 of the housing 24 and to the hull 21, preferably by welding. Our power transmitting unit 29 is disposed partially within the cylinder 28 and consists of a top portion 30 which rests upon and is supported by a disc 31 removably secured to the upper end of the cylinder 28 by means of bolts 31A, as best shown in Fig. 5. A central portion 32 of our power transmitting unit extends through an opening 33 in the disc 31 and supports a lower propeller supporting portion 34. Each of the power transmitting units is adapted to be driven by four engines 35, as shown, of the internal combustion variety, arranged in pairs on opposite sides of the head member 30 so as to occupy comparatively little space laterally of the ship in order to permit mounting of additional units in side by side relationship. The ship is provided with the usual rudder 36, the propelling units 34 being rigidly mounted in position beneath the ship. In Fig. 1 is shown four propulsion units in side-by-side relationship but any number from one up may be used. Likewise, the number of motors embodied in each propulsion unit may be varied from one up depending on the task to be performed and the space available for engines.

As best illustrated in Fig. 5 each of the internal combustion engines or motors 35 is mounted upon two suitable supports 40, which are mounted upon the deck 25. Each engine is provided with the usual marine reversing gear mechanism 41 which likewise constitutes a clutch and with a shaft 42 which is connected through a universal joint 43 to an extensible link 44, the oposite end of which is connected, by means of a universal joint 45, to a shaft 46. The shaft 46 is rotatably mounted in roller bearings 47 secured within a housing 48. The housing 48 is secured to a main central supporting housing 49 constituting a part of the top portion 30, by means of bolts or similar securing means 50 as best shown in Fig. 8. The inner end of the shaft 46 is journaled within roller bearings 51 suitably mounted in the housing 48 and is provided at its inner end with a bevel gear 52, for purposes to be hereinafter set forth.

The housing 49 is provided with a vertically extending annular shoulder portion 55 and a laterally extending annular supporting flange 56 of such dimensions that the shoulder portion 55 is of smaller diameter than the opening 33 in the removable disc 31 and the flange portion of 56 is of greater diameter than the opening 33. The shoulder 55 and the flange portion 56 are provided with faces disposed at right-angles to each other, as is the top member 31 adjacent the opening 33, so that a layer of resilient material 57, such as rubber, is inserted between the shoulder 55 and the flange 56 and the top of the member 31, thus resiliently supporting the housing 49 against movement in all directions. Bolts 58 serve to secure the flange 56 to the top member 31.

The housing member 49 is provided with a downwardly extending shoulder member or flange 60, to which is secured a similarly shaped shoulder member 61, by means of suitable bolts or similar connecting means 62. The flange 61 constitutes a portion of the downwardly extending sleeve 63 which constitutes part of the central portion 32 of the power transmitting unit. The lower end of the sleeve 63 as best shown in Fig. 6, is provided with a flange 64 to which is secured, by means of suitable bolts 65, a flange 66 constituting the upper end of a lower housing member 67 which extends downwardly and is provided at its lower end with an annular flange 68 which is substantially flush with the bottom of the hull of the boat and practically closes the lower end of the cylinder 28, as best illustrated in Fig. 6. The flange 68 is provided with a downwardly extending shoulder member 69 to which is secured, by means of suitable bolts 70, a flange 71 constituting the upper portion of the lower propeller supporting housing 34.

It should be noted that although the cylinder 28 is circular, and the housing 49 and sleeve 63 are both circular, that the housing 49 and the sleeve 63 are not concentric with respect to the cylinder 28, and that accordingly the opening 33 in the top member 31 of the cylinder 38 is eccentric with respect to the cylinder 28.

The sleeve 63 projects downwardly within the cylinder 28 adjacent one wall thereof and the sleeve 67, which is secured to the sleeve 63 by means of the bolts 65, is provided with a curved portion 72 which curves toward the center of the sleeve 28 and is also provided with an upstanding cylindrical flange or cylinder 73. The cylinder 73, as best shown in Figs. 6 and 7, is secured to the bottom flange 68 and merges at one side with a central portion 74 of the sleeve 67. The flange 73 thus constitutes a cylinder which is concentric with the sleeve 28, as best shown in Figure 7. Two pneumatic tires, 77 and 78, are mounted on the cylinder 73 and by means of air tubes 79 and valves 80 are inflated so as to effectually seal the space between the sleeve 73 and the sleeve 28. The valves 80, being located on the upper plate 31, are readily accessible at any time to permit inflation or deflation of the tires 77 and 78. The cylinder 74 is provided with suitable rim members 81 which serve to position the tires horizontally along the cylinder 74.

From the foregoing description it will be apparent that the unit which we have described is a readily detachable mechanism and could, within a very short space of time, be detached from the boat here shown and secured to a second boat or other structure requiring the utilization of power. In order to detach this populsion unit from the boat it is only necessary to disconnect the universal joint 45 of each of the motors from the shafts 46 mounted in the housing 48 whereupon each of the motors is freely movable from the balance of the mechanism. At the same time a certain amount of freedom in tolerances is permitted in mounting these motors by reason of the double universal joint 43 and 45 and the extensible link 44. When the bolts 31—A are removed, and the tires 77 and 78 have been deflated by means of the air valves 80, disc 31 may readily be drawn upwardly by a block and tackle by means of eyelets 83, secured thereto and provided for that purpose. Before drawing the propulsion unit upwardly the propeller 84, which is of the two bladed type, is rotated so as to be in a vertical condition, under which conditions the sleeves 63 and 67 and the housing 34 and propeller 84 will all slide upwardly through the sleeve 28 and the unit may then be shipped to some distant point to be used on another boat if so desired. As the sleeve 28 is welded to the hull of the boat and extends upwardly through the deck 25 it is obvious that no water will leak into the cargo carrying space of the boat when the propulsion unit is removed. At the same time when the unit is in place the tires 77 and 78 prevent the admission of water into the sleeve 28.

The bevel gear 52, one of which is mounted on each of the auxiliary drive shafts 46, meshes with a bevel gear 90, which is secured between an upper flange 91 and a lower flange 92 by means of bolts 93. The upper flange 91 constitutes a lower portion of a sleeve 94 which is mounted on the main propelling shaft 95 and secured in driving relationship therewith by means of a splined portion 96. To the top of the sleeve 94 is secured a disc 97 by means of bolts 98. The disc 97 provides a bearing for a small upwardly extending shaft 99 comprising flexible members, disposed centrally of the main shaft 95, to be driven thereby, and having its upper end extending into an opening in a shaft 99a journalled in a suitable bearing 101. The gear wheel 100 meshes with a gear wheel 102 mounted on a shaft 102a which is journaled in a suitable bearing 103 which, together with the bearing 101, is mounted on a plate 104 concentrically located with respect to the housing 49. The plate 104 is secured to a top casting 105 by means of bolts 106 and the casting 105 is secured to the main housing 49 by means of bolts 107. Supported upon the plate 104 is a threaded projection adapted to receive a collar member 108 constituting part of a flexible cable 108a which, in turn, is part of a tachometer which indicates the speed of the driving shaft 95. Marked in any desired manner on the top surface of the plate 104 are two arrows 109 disposed on opposite sides of the shaft 102a. The relative ratio of the main driving gear 131 to the gear 132 is exactly the same ratio as the tachometer driving gear 100 to the gear 102, as a result of which one revolution of the propeller results in one revolution of the tachometer driving shaft 102a. As a result the propeller may be mounted on its shaft in a definite relationship to a keyway 109a in the shaft 102a so that when the keyway is aligned between the arrows 109 the propeller is in a vertical position, thus permitting the propeller assembly to be raised through the sleeve 28.

The lower flange 92 constitutes the upper portion of a sleeve 110 extending downwardly therefrom and which is rotatably supported on the housing 49 by means of upper roller bearings 111 and lower roller bearings 112, the bearings being held in position by means of an intermediate spacing sleeve 113 and a lower collar member 114 secured thereto by means of bolts 115. The main housing member 49 is also provided with a concentrically located downwardly extending shoulder member 115a to which is secured, by means of bolts 116, a plate 117 having a central aperture 118 within which is secured as by welding, a sleeve member 119 which surrounds the shaft 95 in spaced relationship therewith and extends upwardly through the sleeve 110 and into the sleeve 94.

Figure 10:
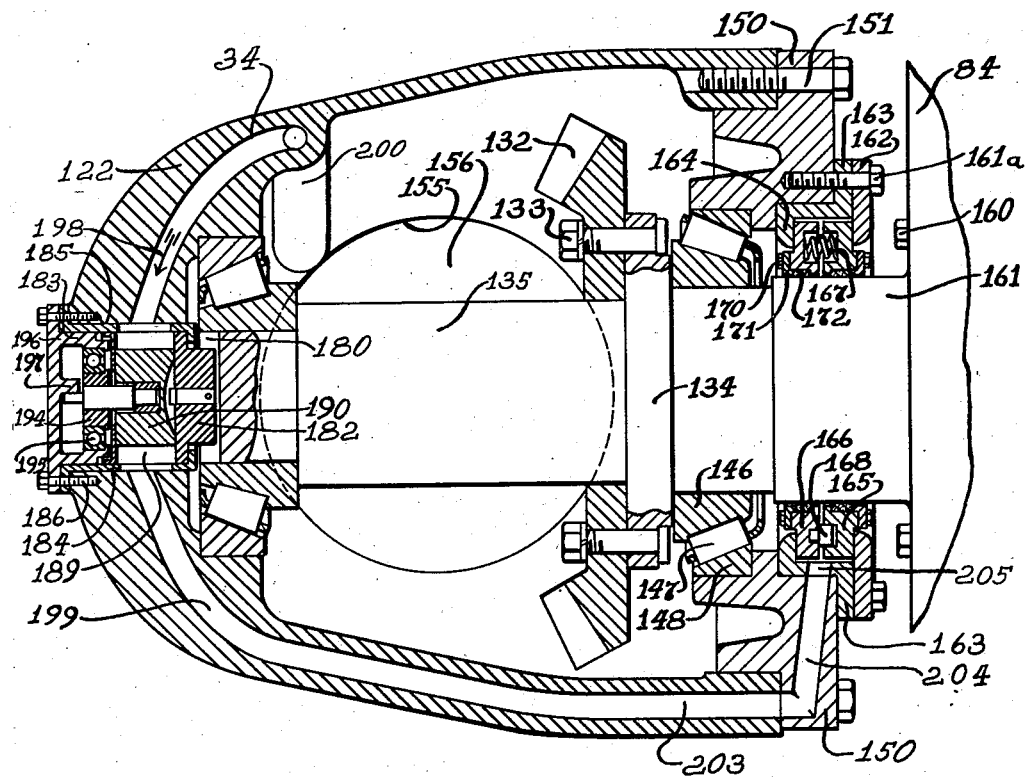
Fig. 10 is a cross-sectional view of the structure illustrated in Fig. 9, the view being taken in a horizontal plane along the line X—X of Fig. 9.
Figure 12:
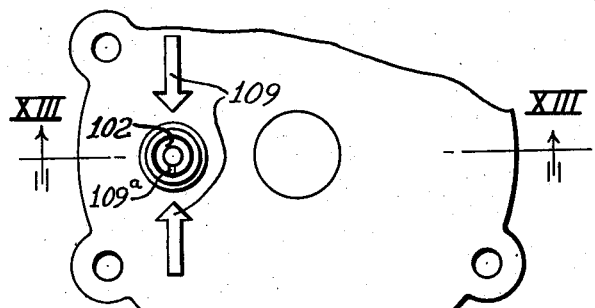
Fig. 12 is a plan view of a tachometer connection useful in connection with our invention.
Figure 13:
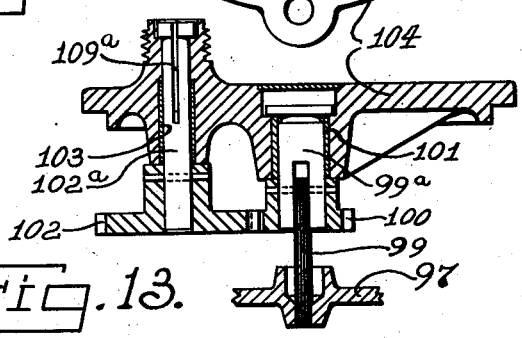
Fig. 13 is a cross-sectional view of the tachometer drive, the section being taken along the line XIII—XIII of Fig. 12.

Turning now to Figures 6, 9, and 10, we find that the main shaft 95 extends downwardly through the sleeve 63 and through the sleeve 67 and 74 terminating adjacent the lower end of the latter. A collar member 120 is splined to the shaft 95 and also to a lower shaft 121, which is supported within a lower housing 122 by means of a bearing member 123 comprising two sets of roller bearings 124. The shaft 121 is provided with collars 125 which serve to keep it fixed with respect to the inner race of the bearing members 123.

As best illustrated in Figure 9, the lower end of the shaft 121 has secured thereto a collar member 127 which is provided with a cylindrical portion 129 serving as a support for the inner race of a roller bearing 130 the outer race of which is fastened in the housing 122 constituting a portion of the lower propeller supporting portion 34. The bearing race 130 is held in position on the collar member 127 by the threaded locking nut 128. Integral with the collar member 127 is a bevel gear 131 which meshes with a cooperating bevel gear 132 which is secured by means of bolts 133 to a flange 134 on a substantially horizontally extending shaft 135. The collar member 127 is held in position on the shaft 121 by means of a suitable retaining washer 136 and lock nut 137.

The shaft 135 is provided at one end with a reduced portion 139 on which is mounted an inner bearing race 140 adapted to be engaged by roller bearings 141 having an outer race 142 mounted in a suitable opening in the lower end of the housing 122. On the opposite end of the shaft 135 is mounted the propeller 84 which is of the two blade variety and which is keyed to the shaft by means of a key member 145. On the propeller side of the flange 134 is mounted a bearing race 146 on which are mounted roller bearings 147 which roll on an outer race 148 rigidly mounted in a suitable recess 149 in a face plate 150, the latter being secured to the housing 122 by means of suitable securing bolts 151. The face plate 150 surrounds the shaft 135 and provides the support for a suitable water seal 154. An opening 155 is provided in the lower surface of the housing 122 to permit of inspection and adjustment of the parts contained within the housing and is adapted to be sealed by a plate 156 secured to the housing 122 by means of suitable screws or bolts 157.

Secured to the propeller 84 by means of bolts 160 is an annular plate 161 of substantially L shape in cross-section, which surrounds and closely engages the outer end of the shaft 135 and is adapted to rotate therewith. Mounted on the face plate 150 by means of bolts 161a are two discs 162 and 163, the disc 162 being a flat face plate and the disc 163 having a portion which closely engages the disc 162 and is of substantially equal outer diameter therewith and is provided with an offset portion 164 disposed parallel with and in spaced relationship to the inner portion of the disc 162, the internal diameter of the disc 162 and the offset portion 164 of the disc 163 being substantially equal. Between the inner portion of the disc 162 and the offset portion 164 of the disc 163 are two discs 165 and 166 each of which is provided with a centrally disposed recess in its opposing face and into which combined recess is disposed a plurality of small compression springs 167 which serve to hold the disc 165 against the stationary disc 162 and the disc 166 against the stationary offset portion 164 of the disc 163. Pins 168 located in recesses in the discs 165 and 166 serve to prevent relative rotation therebetween so as to interfere with the proper operation of the springs 167.

Secured by means of bolts 170 to each of the discs 165 and 166 are collar members 171 which rotate with the discs and which engage packing members 172 which engage the collar member 161 mounted on the shaft 135. The discs 165 and 166 are composed of a bearing material such as a lubricant impregnated porous bronze material, or the like, so that they will slide freely against the discs 162 and 163 when the shaft rotates or they may rotate with the discs 162 and 163 and slide with respect to the packing members 172, depending upon where the greater friction arises.

The reduced end of the shaft 135 opposite the propeller is provided with a transverse disposed notch 180 which is adapted to slidably closely engage an actuating member 182 of an oil pumping mechanism 183. The oil pumping mechanism 183 is contained within a substantially circular housing or sleeve 184 which fits into an opening 185 in housing 122 in alignment with the center of the shaft 135, the housing 184 being secured to the housing 122 by means of suitable bolts 186, thus permitting removal of the pumping mechanism by removing the bolts 186. As best shown in Figure 11 the housing 184 is provided with two oppositely disposed arcuate cut away portions 187. Within the housing or shell 184 is mounted a rotatable portion 188 provided with a cylindrical opening 189 extending therethrough at right-angles to the axis of the shaft 135. Disposed within the cylindrical opening 189 is a cylinder assembly 190 comprising two cylinder members 191 connected together by an intermediate section 192 provided with an axially extending pin 193, the pin being eccentric with respect to the shaft 135 but having an axis parallel thereto. The pin 193 is journaled in a supporting member 194, as best shown in Fig. 9, which in turn is rotatably mounted upon roller bearings 195 mounted within a suitable housing 196. Housing 196 constitutes the end plate for the sleeve member 184 and is secured to the housing member 122 by the bolts 186. The pin 193, although rotatably secured within the plate 194, is eccentric with respect to the bearing 195. An end portion of the pin 193 extends beyond the journal member 194 and engages a fixed stop member 197 mounted on the plate 196.

By providing openings in the housing 122 at opposite sides of the sleeve 184, for example an inlet opening 198 and an outlet opening 199, as shown in Figure 11, the pumping mechanism will operate to pump a liquid in through the opening 198 and out through the opening 199. This occurs because with the pin 193 eccentric with respect to the axis of the shaft and prevented from revolving by means of the stop 197 rotation of the member 188 caused by rotation of the shaft 135, will cause the piston member 190 to draw away from the opening 198 as it passes that opening and to approach the opening 199 as it passes that opening. The piston 191 will do likewise. As this will tend to create a vacuum at the opening 198 and a pressure at the opening 199 it will constitute a pump which can be readily detached from the housing by merely removing the bolts 186. In the event that the shaft 135 is rotated in the opposite direction the pin 193 will be free to move with the shaft through an arc of approximately 270° and will then engage the stop member 197 but in such a position that with the reversal of the direction of the drive the pump will continue to create a vacuum at 198 and the pressure at 199. As a result the pump will continue to pump liquid in the same direction regardless of the direction of rotation of the shaft. This pump per se is not our invention and is not claimed per se, but the means by which the pump is rendered readily detachable for inspection, repair and replacement is our invention and is claimed. In like manner the shaft seal per se is not our invention, but is a part of the novel combination which we have devised and claimed.

As best illustrated in Figure 10, the opening 198 extends through the housing 122 through a raised ridge 200 to the lower part of the housing 122, as shown at 201 in Figure 9. As point 201 constitutes approximately the lowermost point in the lower portion of the housing, it acts as a sump for the lubricating oil used in the entire mechanism and the port 201 being located at just above the lowest portion of the sump, picks up the oil but not the dirt or other foreign matter which settles in the bottom of the sump, and carries the oil through the opening in the ridge 200 and through the intake port 198 to the pump 183. From the pump the oil is forced through outlet passageway 199 into a horizontally extending opening 203 in the housing 122 and thence into an opening 204 in the face plate 150. The opening 203 is aligned with an opening 204 in the face plate 150. The opening 204 is aligned with an opening 205 in the laterally extending intermediate portion of the flange 163 so that the oil passes through the passageway 204 and 205 into open communication with the portion of the seal between the two seal discs 165 and 166. The pressure of the oil between these two discs serves to move them away from each other and into close contacting engagement with the discs 162 and 163.

Small openings in the discs 165 and 166 permit a small amount of lubricant to pass therethrough into engagement with the contacting surfaces of the discs 162 and 163 to provide lubrication therebetween. The oil after passing between the discs 165 and 166 and forcing them apart passes into an opening 208 in the upper portion of the face plate 150, as best shown in Fig. 9. The upper end of the opening 208 is closed by a plug 209 and the oil passes through a communicating openings 210 in the face plate into an open duct 211 in the housing 122. The duct 211 leads into a duct 212 into which is closely fitted a pipe 213 which carries the oil upwardly to an opening 214 which communicates with a duct 215 in the upper portion of the housing 122, as best shown in Fig. 6. The duct 215 is an open communication with a duct 216 in the lower portion of the housing 67 and into which a pipe 217 fits very closely so as to carry the oil upwardly through the housing 67 into a suitable opening 218 at the junction of the housing 63 and 67. An additional oil pipe 219 likewise fits closely into the opening 218 and carries the oil upwardly on the outside of the housing 63 to an opening 220 at the juncture of the housing 63 and 49, as best shown in Fig. 8.

An upwardly extending passageway 221 in the housing 49 communicates with a horizontally extending passageway 222 to the outer end of which is secured a pressure gauge 223 by which it is possible for the operator to determine the oil pressure at that point. A vertically extending oil passageway 224 is in open communication with passageway 222 has mounted therein a sliding valve member 225 which is pressed downwardly by a spring 226 under normal conditions. When the pressure is sufficiently great the valve 225 moves upwardly thus uncovering a passageway 227 into which the oil from the passageway 224 immediately flows into the upper housing 49.

The inner end of the passageway 227 opens into the housing 49 at a point immediately above the bearings 111. The oil will therefore flow downwardly through the bearings 111 over the spacing plate 113, through the lower bearings 112, onto the lower plate 117. As the oil accumulates there it will rise into a space 230 between the sleeve 110 and the inner sleeve 119. When the level of the oil in the chamber 240 gets sufficiently high it will overflow the top of the sleeve 119 and follow the shaft 95 directly down through the housings 63 and 67 to the bearings 123, and thence through the housing 122 to the bearings 130, and to the sump in the lower part of the housing 122, lubricating the bearings 141 and 147 on the way although these latter bearings might very well be immersed in oil under normal circumstances. When the oil overflows the sleeve 119 it will be high enough in the housing 49 to cover the bevel disc gear 90 and the lower portion of the bearings 51 of the incoming power shafts 46. In the event that the oil does not pass with sufficient rapidity through the bearings 111 and 112 and between the sleeve 119 and the shaft 95 it will rise in the upper chamber of the housing 49 until it reaches an opening 232 in the upper portion thereof which communicates with a passageway 233 extending downwardly directly into the housing 63 thus permitting the ready escape of any excess quantity of oil.

In order to prevent the possibility of oil being prevented from flowing down through the bearings 130 by air pressure within the lower housing we have provided a vent 130a in the member supporting the bearing 130. The vent is so arranged that its upper end is well above the bearing 130.

In Fig. 4 we have illustrated a modification of our invention in which the universal joints 45 of the extensible units 44 are connected to one side of fluid couplings 240. The shaft 46 being connected to a runner or fluid actuating member 241 which, through the agency of the fluid, engages the vanes 242 so as to operate the housing 243, the housing 243 being rigidly connected with the shaft 244 on the inner end of which is mounted the bevel gear 52 as previously described. The chief advantage of the fluid coupling is that it permits much smoother application of force and eliminates the minor pulsations which each motor shaft attempts to impart to the main drive shaft thus materially reducing the strain on the driving mechanism. From experience it has been found that it is very difficult to reverse a power unit of this type without exerting severe strains on the driving mechanism, which are materially reduced by the use of fluid couplings.

From the foregoing description it will be apparent that by means of the reduction gearing 52, 90, 131, 132, the final speed of the propeller will be materially lower than that of the motors and may be controlled as desired by varying the ratio of the various gears.

It will also be apparent that a power unit of this type, equipped at its lower end with a pump, could be lowered into a large tank or ship hold to pump liquids therefrom, or to be connected to any desired type of power equipment.

Although we have illustrated but one form of our invention and one modification thereof, and although we have described in detail but a single application thereof it will be apparent to those skilled in the art that it is not so limited but that various modifications and changes may be made therein without departing from the spirit of our invention or the scope of the appended claims.

We claim:

1. In a motor boat, a sleeve extending substantially through said boat, a housing extending through said sleeve of substantially equal length therewith and mounted in sealing engagement therewith, a shaft extending through said housing, a power unit mounted on said boat adjacent the upper ends of said sleeve and housing and operatively connected to drive said shaft, a second housing rigidly secured to the lower end of the first housing, a substantially horizontal shaft journalled in said second housing and having a propeller mounted thereon, a water sealing device mounted on said second housing and surrounding said horizontal shaft, an oil pump mounted in said second housing and operatively connected to said horizontal shaft, a passageway interconnecting the intake side of said pump to the bottom of said second housing and a passageway interconnecting the outlet side of said pump with the interior of said sealing device.

2. In a motor boat, a hull provided with a deck, a substantially circular and vertically disposed sleeve extending through said hull and deck, a casing extending through said sleeve in spaced relationship therewith, a shaft extending through said casing and mounted therein by means of bearings, a propeller mounted on the lower end of said casing below said hull and operatively connected to said shaft, a plurality of motors mounted on said deck and operatively connected to the upper end of said shaft, a rubber tire encircling the lower end of said casing adapted to effect a sealing engagement with said sleeve when inflated, and a support for the upper end of said casing comprising a closure member adapted to close the upper end of said sleeve and provided with an opening therein adapted to receive said casing, and an annular rubber member disposed between said closure member and said casing adapted to resiliently oppose either vertical or lateral movement therebetween.

3. In a motor boat, a hull provided with a deck, a substantially circular and vertically disposed sleeve extending through said hull and deck, a casing extending through said sleeve in spaced relationship therewith, a shaft extending through said casing and mounted therein by means of bearings, a propeller mounted on the lower end of said casing below said hull and operatively connected to said shaft, a plurality of motors mounted on said deck and operatively connected to the upper end of said shaft, a rubber tire encircling the lower end of said casing adapted to effect a sealing engagement with said sleeve when inflated, and a support for the upper end of said casing comprising a closure member adapted to close the upper end of said sleeve and provided with an opening therein adapted to receive said casing, and an annular rubber member of substantially L shape in cross-section disposed between said closure member and said casing adapted to resiliently oppose either longitudinal movement there-between.

4. In a motor boat, a hull provided with a deck, a substantially circular and vertically disposed sleeve extending through said hull and deck, a casing extending through said sleeve in spaced relationship therewith, a shaft extending through said casing and mounted therein by means of bearings, a propeller mounted on the lower end of said casing below said hull and operatively connected to said shaft, a plurality of motors mounted on said deck and operatively connected to the upper end of said shaft, a rubber tire encircling the lower end of said casing adapted to effect a sealing engagement with said sleeve when inflated, and a support for the upper end of said casing comprising a member fixedly mounted with respect to the upper end of said casing and provided with an opening in alignment therewith with said sleeve and adapted to receive said casing, and a solid rubber annular member interposed between parallel surfaces of said casing and said member adapted to resiliently oppose relative movement there-between.

5. In a motor boat, a hull provided with a deck, a substantially circular and vertically disposed sleeve extending through said hull and deck, a casing extending through said sleeve in spaced relationship therewith, a shaft extending through said casing and mounted therein by means of bearings, a propeller mounted on the lower end of said casing below said hull and operatively connected to said shaft, a plurality of motors mounted on said deck and operatively connected to the upper end of said shaft, said casing being supported by means of a plate secured to the upper end of said sleeve and provided with an opening therein adapted to receive the upper end of said casing, said casing having a flange of greater diameter than said opening disposed above said plate, a rubber member disposed intermediate the lower face of said flange and the vertical surface of said casing on one hand and the upper horizontal and cylindrical surface of said plate opening on the other hand, and a rubber annulus surrounding the lower end of said casing within the sleeve and inflatable to effect a sealing engagement therewith whereby the lower portion of said casing is maintained in proper position within said sleeve.

6. A power drive comprising a substantially vertical power transmitting shaft, a main housing enclosing the upper end of said shaft and supporting bearings for said shaft, a gear mounted on the upper end of said shaft, pinions mounted on driving shafts journaled in openings in said main housing and meshing with said gear, a sleeve surrounding said shaft adjacent its upper end, the lower end of said sleeve being mounted on said housing in oil sealing engagement to form therewith an oil reservoir, the top of said sleeve being disposed at a higher level than the main shaft bearings and the points of engagement of the gear and pinions, and means for pumping oil into said reservoir, the space between said sleeve and said main shaft providing an overflow conduit for said reservoir.

7. A power drive comprising a substantially vertical power transmitting shaft, a main housing enclosing the upper end of said shaft and supporting bearings for said shaft, a gear mounted on the upper end of said shaft, pinion mounted on driving shafts journalled in openings in said main housing and meshing with said gear, a sleeve surrounding said shaft adjacent its upper end, the lower end of said sleeve being mounted on said housing in oil sealing engagement to form therewith an oil reservoir, the top of said sleeve being disposed at a higher level than the main shaft bearings and the points of engagement of the gear and pinions, and means for pumping oil into said reservoir, the space between said sleeve and said main shaft providing an overflow conduit for said reservoir and a second overflow conduit having an opening into said housing above the top of said sleeve.

8. A power drive comprising a substantially vertical power transmitting shaft, a sleeve member rigidly secured to the upper end of said shaft, a ring gear secured to said sleeve, a lower sleeve secured to said first sleeve and extending downwardly therefrom in spaced relation to said shaft, a main housing enclosing said shaft and said sleeves, bearing members mounted in said housing and engaging said lower sleeve to journal and support said shaft, and means for pumping oil into said housing at a point above said bearings to lubricate them.

9. A power drive comprising a substantially vertical power transmitting shaft, a sleeve member rigidly secured to the upper end of said shaft, a ring gear secured to said sleeve, a lower sleeve secured to said first sleeve and extending downwardly therefrom in spaced relation to said shaft, a main housing enclosing said shaft and said sleeves, bearing members mounted in said housing and engaging said lower sleeve to journal and support said shaft, a plurality of openings in said main housing, a plurality of driving shafts journalled in said openings, pinions mounted on said driving shafts and meshing with said ring gear, means for pumping oil into said housing, and means for establishing a normal oil level therein above the main shaft bearings and above the points of contact of the pinions with the ring gear.

10. A power drive comprising a substantially vertical power transmitting shaft, a sleeve member rigidly secured to the upper end of said shaft, a ring gear secured to said sleeve, a lower sleeve secured to said first sleeve and extending downwardly therefrom in spaced relation to said shaft, a main housing enclosing said shaft and said sleeves, bearing members mounted in said housing and engaging said lower sleeve to journal and support said shaft, an inner sleeve mounted at its lower end on said main housing in oil sealing relationship therewith and surrounding said main shaft in spaced relation therewith and within said lower sleeve, the upper end of said inner sleeve being disposed above the main shaft bearings and the space between said inner sleeve and shaft serving as an oil overflow passageway, and means for pumping oil into said main housing.

11. A power drive comprising a substantially vertical power transmitting shaft, a sleeve member rigidly secured to the upper end of said shaft, a ring gear secured to said sleeve, a lower sleeve secured to said first sleeve and extending downwardly therefrom in spaced relation to said shaft, a main housing enclosing said shaft and said sleeves, bearing members mounted in said housing and engaging said lower sleeve to journal and support said shaft, a plurality of openings in said main housing, a plurality of driving shafts journalled in said openings, pinions mounted on said driving shafts and meshing with said ring gear, an inner sleeve mounted at its lower end on said main housing in oil sealing relationship therewith to form an oil reservoir therewith and surrounding said main shaft in spaced relation therewith and within said lower sleeve, the upper end of said inner sleeve being disposed above the main shaft bearings and the points of contact of the ring gear and the pinions, said inner sleeve serving as an overflow oil outlet passageway, and means for pumping oil into said housing reservoir.

12. A power drive comprising a substantially vertical power transmitting shaft, a sleeve member rigidly secured to the upper end of said shaft, a ring gear secured to said sleeve, a lower sleeve secured to said first sleeve and extending downwardly therefrom in spaced relation to said shaft, a main housing enclosing said shaft and said sleeves, bearing members mounted in said housing and engaging said lower sleeve to journal and support said shaft, a plurality of openings in said main housing, a plurality of driving shafts journalled in said openings, pinions mounted on said driving shafts and meshing with said ring gear, an inner sleeve mounted at its lower end on said main housing in oil sealing relationship therewith to form an oil reservoir therewith and surrounding said main shaft in spaced relation therewith and within said lower sleeve, the upper end of said inner sleeve being disposed above the main shaft bearings and the points of contact of the ring gear and the pinions, said inner sleeve serving as an overflow oil outlet passageway, means for pumping oil into said housing reservoir, and a second oil overflow conduit having an intake port in said housing above the top of said inner sleeve and an outlet port in said housing below said reservoir.

13. A power drive comprising a substantially vertical power transmitting shaft, a sleeve member rigidly secured to the upper end of said shaft, a ring gear secured to said sleeve, a lower sleeve secured to said first sleeve and extending downwardly therefrom in spaced relation to said shaft, a main housing enclosing said shaft and said sleeves, bearing members mounted in said housing and engaging said lower sleeve to journal and support said shaft, a plurality of openings in said main housing, a plurality of driving shafts journalled in said openings, pinions mounted on said driving shafts and meshing with said ring gear, an inner sleeve mounted at its lower end on said main housing in oil sealing relationship therewith to form an oil reservoir therewith and surrounding said main shaft in spaced relation therewith and within said lower sleeve, the upper end of said inner sleeve being disposed above the main shaft bearings and the points of contact of the ring gear and the pinions, said inner sleeve serving as an overflow oil outlet passageway, means for pumping oil into said housing reservoir, and a second oil overflow conduit having an intake port in said housing above the top of said inner sleeve and an outlet port in said housing below said reservoir, said last named passageway being cast integral with said main housing.

FREDERIC W. SLACK.
MELBOURNE L. CARPENTIER.